(12) United States Patent
Kumashiro

(10) Patent No.: US 10,590,831 B2
(45) Date of Patent: Mar. 17, 2020

(54) LEAD WIRE INSULATING STRUCTURE IN FLOW RATE CONTROL VALVE DEVICE

(71) Applicant: NIPPON THERMOSTAT CO., LTD., Tokyo (JP)

(72) Inventor: Tsuyoshi Kumashiro, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 95 days.

(21) Appl. No.: 16/073,341

(22) PCT Filed: Oct. 5, 2016

(86) PCT No.: PCT/JP2016/079583
§ 371 (c)(1),
(2) Date: Jul. 27, 2018

(87) PCT Pub. No.: WO2017/130466
PCT Pub. Date: Aug. 3, 2017

(65) Prior Publication Data
US 2019/0032540 A1 Jan. 31, 2019

(30) Foreign Application Priority Data
Jan. 29, 2016 (JP) .................................. 2016-015927

(51) Int. Cl.
*F01P 7/16* (2006.01)
*G05D 23/30* (2006.01)
(Continued)

(52) U.S. Cl.
CPC .............. *F01P 7/16* (2013.01); *F16K 31/025* (2013.01); *G05D 23/1919* (2013.01);
(Continued)

(58) Field of Classification Search
CPC .. G05D 23/1919; G05D 23/30; G05D 23/303; G05D 23/32; F01P 7/16; F01P 7/167; F01P 2070/04; H05B 3/48
See application file for complete search history.

(56) References Cited

U.S. PATENT DOCUMENTS

| 6,049,065 A | 4/2000 | Konishi |
| 2004/0112050 A1* | 6/2004 | Suda .................. G05D 23/1921 60/528 |

(Continued)

FOREIGN PATENT DOCUMENTS

| EP | 0853267 B1 | 12/2001 |
| FR | 2989551 A1 | 10/2013 |

(Continued)

OTHER PUBLICATIONS

International Search Report (ISR) for Application No. PCT/JP2016/079583 dated Dec. 20, 2016.
(Continued)

*Primary Examiner* — Marc E Norman
(74) *Attorney, Agent, or Firm* — Isshiki international Law Office; Joseph P. Farrar, Esq.

(57) ABSTRACT

An electronically controlled thermostat device simplifies an insulating structure and external portions of the lead wires of a heater incorporated for temperature control of a thermoelement, reduces the number of different parts, and facilitates assembly. A pair of insulating rod pieces clamps the heater at the front and clamps a pair of lead wires from the heater while maintaining an insulated state, and a connector member attached to a side of the insulating rod pieces opposite the portion that holds the heater is mounted on the outside of a device housing. The connector member at an inner end has connector terminals provided with a pair of lead end connecting pieces to which the lead wires are connected, and has an engaging concave portion that engages an engaging convex portion for preventing twisting provided on a side of the insulating rod pieces opposite the portion that holds the heater.

8 Claims, 5 Drawing Sheets

(51) Int. Cl.
*H05B 3/48* (2006.01)
*H05B 3/14* (2006.01)
*F16K 31/02* (2006.01)
*G05D 23/19* (2006.01)

(52) U.S. Cl.
CPC .............. *H05B 3/141* (2013.01); *H05B 3/48* (2013.01); *F01P 7/167* (2013.01); *F01P 2070/04* (2013.01)

(56) References Cited

U.S. PATENT DOCUMENTS

| | | | | |
|---|---|---|---|---|
| 2008/0290085 | A1* | 11/2008 | Schlipf | H05B 3/06 219/526 |
| 2011/0095091 | A1 | 4/2011 | Suda et al. | |
| 2015/0351157 | A1* | 12/2015 | Cho | H05B 3/0014 219/541 |
| 2017/0016382 | A1* | 1/2017 | Ryu | F01P 7/167 |
| 2017/0114703 | A1* | 4/2017 | Kim | H05B 3/44 |

FOREIGN PATENT DOCUMENTS

| | | |
|---|---|---|
| JP | H1112040 A | 1/1999 |
| JP | 2005155831 A | 6/2005 |
| JP | 2009228988 A | 10/2009 |
| WO | 2010004606 A1 | 1/2010 |
| WO | 2012080417 A1 | 6/2012 |

OTHER PUBLICATIONS

Translation of the ISR for Application No. PCT/JP2016/079583 dated Dec. 20, 2016.
Written Opinion of the International Search Authority for Application No. PCT/JP2016/079583 dated Dec. 20, 2016.

\* cited by examiner

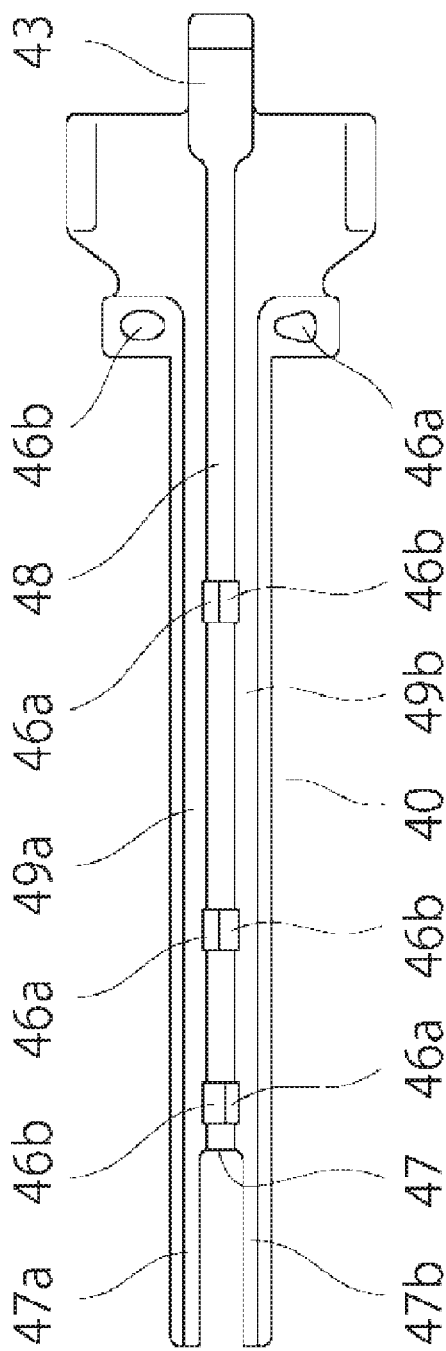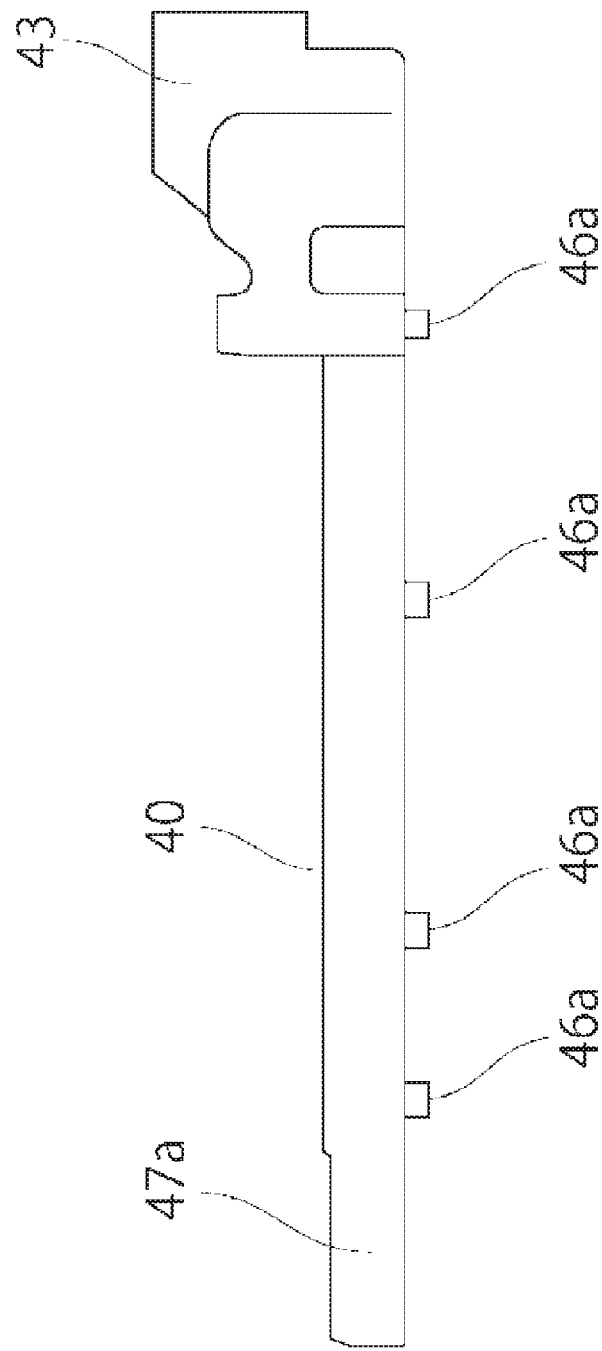

LEAD WIRE INSULATING STRUCTURE IN FLOW RATE CONTROL VALVE DEVICE

CROSS-REFERENCE TO RELATED APPLICATIONS

The present application is a national phase entry under 35 U.S.C. § 371 of International Application No. PCT/JP2016/079583, filed Oct. 5, 2016, which claims priority from Japanese Application No. 2016-015927, filed Jan. 29, 2016, the entire disclosures of each of which are hereby incorporated by reference herein.

BACKGROUND

Technical Field

The present invention relates to a lead wire insulating structure for externally connecting the lead wires of a heater in a flow rate control valve of an electronically controlled thermostat or the like that has a thermo-element in which the heater is inserted and disposed in a piston, for example.

Background Art

For example, a thermostat device disposed in a coolant system of an automobile engine and which variably controls the water temperature incorporates a thermal expansion unit that expands and contracts by sensing changes in temperature of the coolant flowing in the circulation path. The thermostat device functions to keep the coolant at a predetermined temperature by opening and closing the valve stem using the change in volume that accompanies expansion and contraction of the wax.

In this type of thermostat device, a heater means for performing temperature control of the thermal expansion unit, provided in a casing that encapsulates wax, enables control of the change in volume of the wax using the heat generated by the heater means.

Conventional electronically controlled thermostat devices of this kind, as described for example in Patent Document 1, by providing the heater inside the piston of the thermo-element and activating the heater to generate heat, heat the thermal expansion unit inside the thermo-element to cause the thermo-element to operate to open and close the valve.

Also, in this type of electronically controlled thermal device, as shown for example in Patent Document 2, the extracted portion of the lead wires from the heater is soldered to a connector terminal of a resin connector mounted on the outside of the device housing and then molded with a resin material.

PRIOR ART DOCUMENTS

Patent Documents

Patent Document 1 WO 2010/004606 A1
Patent Document 2 EP 0853267 B1

SUMMARY OF THE INVENTION

Technical Problem

According to the configuration of Patent Document 1 described above, there were many constituent parts such as a piston guide and the like, and since it is necessary also to extend the piston heater to the vicinity of the connector for external connection, material costs and manufacturing costs were also high. Moreover, when a heater made of ceramic is used, there is a risk that it may be broken by being affected by vibrations or the like during the assembly process or in the process of mounting in an automobile, and since it is necessary to take countermeasures against this, inevitably it was troublesome and costs were high.

Moreover, according to the structure of Patent Document 2 described above, since the casing of the resin connector is not fixed in the direction of rotation with respect to the device housing, there was a possibility that the lead wires from the heater get twisted and break or the connection portion is damaged, and countermeasures thereto were necessary.

In addition, although the soldered portion is protected by the resin material, if it is necessary to visually inspect the bonding after assembly, there was also a problem that the bonding cannot be confirmed once the soldered portion is molded with the resin material.

For this reason, conventionally, in this kind of electronically controlled thermal device, the heater (including the lead wires) is inserted in a tube and insulated from the piston, and an insulating rod is interposed between these two lead wires to insulate the lead wires from each other, and moreover, since there is a possibility of contact with piston at the connection between connector terminals and the lead wires exposed from the tube, a plate is provided to enable the relative positions of these lead wires and the insulating rod to provide insulation protection.

However, with such a structure, there are many component parts for insulation protection of the heater and the lead wires and there are problems such as an increase in the number of steps in the assembly process. Also, because the heater and the insulating rod are inserted in the tube, depending on the dimensional tolerances in the fitting direction insertability can be poor, the tube breaks, the lead wires are liable to bend and yield is poor. Moreover, if the tube breaks, the piston and the lead wire are conducted and the circuit is short-circuited, resulting in malfunction of the thermostat device. Moreover, since the plate is fitted in place so as not to be displaced, there is also a problem that the tube is easily deformed, and the shape is not stabilized.

In order to solve such problems, conceivably the heater (including the lead wires) can be molded as a single piece of resin, but since the heater is made of ceramic, there is a possibility that the heater will crack when it is placed in a mold. There is also a risk that the lead wires or the soldered portion will bend and appear on the surface of the resin at the time of resin molding when molding with the resin material or due to the injection pressure when molding with the resin material as in Patent Document 2.

For this reason, in this type of electronically controlled thermal device, taking into consideration the above-mentioned points, any measure capable of achieving a reduction in the number of different parts, shortening the assembly process, making handling more efficient, reducing costs, etc., is desirable.

The present invention is conceived in view of the above circumstances, and has as its objective to provide a lead wire insulating structure in a flow rate control valve device that includes heater and the like made of ceramic that can be easily and securely held in place, which forms the member for insulating the two lead wires from the heater into a single unit, and which reduces the number of different parts and provides a shorter and more efficient assembly process by utilizing the elasticity of a resin member or the like instead of an adhesive when attaching that single unit member to a heater assembly consisting of the heater and the lead wires, and moreover prevents twisting of the heater lead wires in the manufacturing process, etc., and which protects the junction between the lead wire and the connector terminals as well as allows the state of the junction to be checked.

Solution to Technical Problem

To achieve this objective, a lead wire insulating structure in a flow rate control valve device according to the present invention provides, in a flow rate control valve device including a heater inserted and disposed in a device housing, the lead wire insulating structure comprising a pair of insulating rod pieces configured to clamp the heater by a front end portion and clamp and hold a pair of lead wires from the heater while maintaining the lead wires in an insulated state, and a connector member attached to a side of the insulating rod pieces opposite a side on which the insulating rod pieces clamp the heater. The connector member has, on an inner end, a pair of lead end connecting pieces to which the lead wires are connected, and an engagement concave portion that engages an engagement convex portion provided on a side of the insulating rode pieces opposite the side on which the insulating rod pieces hold the heater.

In the lead wire insulating structure in a flow rate control valve device according to the present invention the pair of insulating rod pieces are formed in the same shape and are provided with one or more engaging portions when the insulating rod pieces are put together to form a single unit that clamps the heater and the pair of lead wires on both sides thereof.

In the lead wire insulating structure in a flow rate control valve device according to the present invention, a window, through which a state of connection between the lead wires and the lead end connecting pieces is visible, is formed in a part of a rear end portion of the pair of insulating rod pieces.

In the lead wire insulating structure in a flow rate control valve device according to the present invention movement in a longitudinal direction of the insulating rod pieces is restricted by the insulating rod pieces being clamped between the end portion of the heater on the lead wire exposed side and the end portion of the connector provided with the engagement concave portion.

In the lead wire insulating structure in a flow rate control valve device according to the present invention, an end portion of the heater on the lead wire exposed side is configured to engage a groove bottom edge portion of slit grooves in the insulating rod pieces.

In the lead wire insulating structure in a flow rate control valve device according to the present invention, the heater and the lead wires are clamped by the pair of insulating rod pieces and a piston having a substantially bottomed cylindrical shape is fitted around the outside of the heater and lead wires.

In the lead wire insulating structure in a flow rate control valve device according to the present invention, the heater is a ceramic heater.

In the lead wire insulating structure in a flow rate control valve device according to the present invention, the flow rate control valve device is an electronically controlled thermostat device in which the heater for temperature control of a thermo-element that senses temperature of a fluid is inserted.

Effect of the Invention

As described above, the lead wire insulating structure in a flow rate control valve device of the present invention includes a pair of insulating rod pieces configured to clamp the heater by a front end portion and clamp and hold a pair of lead wires from the heater while maintaining the lead wires in an insulated state and a connector member attached to a side of the insulating rod pieces opposite a side on which the insulating rod pieces clamp the heater. The connector member has on its inner end a pair of lead end connecting pieces to which the lead wires are connected, and one or more engagement concave portions that engage an engagement convex portion provided on a side of the insulating rode pieces opposite the side on which the insulating rod pieces hold the heater, so that, despite the simple configuration, the various excellent effects listed below are achieved.

1. The number of constituent parts in the lead wire exposed portion of the heater, and in particular the type and quantity of such insulating parts, can be reduced, as can the number of steps in the installation process, and moreover the production process equipment conventionally required, such as a tube cutter, tube heat/deformation machine, heater production machinery, etc., can be reduced, and the structure can be installed using only a simple jig, so that the number of workers can be reduced, work efficiency can be greatly improved, and costs can be reduced.

2. The heater and the pair of lead wires are held by a pair of insulating rod pieces, and a piston having a bottomed cylindrical shape is provided around the outside thereof, so that it is unnecessary to mold the heaters, lead wires, etc., and it is possible to reduce the risk of cracking of the ceramic heater and cutting or bending (twisting) and the like of the lead wires.

3. The functions of guiding the insulating rod pieces themselves with peripheral parts, of insulation, mounting, and protection of the structure from vibrations from the automobile, can be concentrated in a single piece.

4. The lead wires of the heater are covered with grease to mitigate migration and prolong the life of the heater, but since the lead wires are clamped by a pair of insulating rod pieces and covered with a piston around the outside thereof it is possible to prevent the grease from leaking out due to vibrations from the automobile.

Migration is a phenomenon in which a metal component moves over and through nonmetallic media due to the effect of an electrical field. In this phenomenon, the metal components are in the metallic state before and after migration and show conductivity. Also, the flowing metal constituent parts will precipitate and grow like ice crystals.

5. Because it is inserted inside the piston and device housing, the pair of insulating rod pieces will not come off.

Moreover, such an arrangement can lead to a reduction in parts (e.g., reduction of insulating tubing) for electrical products using lead wires such as temperature and pressure sensors.

6. By mounting the connector member having the connector terminals that connect the pair of lead wires using lead end connecting pieces on the outside of the device housing, twisting of the lead wires and further of the heater in the direction of rotation can be prevented.

7. Since the two members of the same shape are configured to be fitted together using only resin irregularities and their elasticity, without requiring an adhesive or adhesion device such as vibration welding, no additional resources or special equipment are required.

8. It becomes possible to mount not only the heater and lead wires but also the insulating rods while preventing twisting.

9. Whether the lead wires of the heater and the connector terminals are securely joined can be visually confirmed from the outside at the time of assembly, providing not only excellent workability but also improved working efficiency.

BRIEF DESCRIPTION OF THE DRAWINGS

FIGS. 4A and 4B are a front view and a plan view, respectively, of the insulating rod pieces viewed from the inside, for illustrating the insulating rod pieces.

DETAILED DESCRIPTION OF EMBODIMENTS

FIGS. 1 to 5 show an embodiment of a lead wire insulating structure in a flow rate control valve device according to the present invention. In these figures, in the present embodiment, an electronically controlled thermostat device is used as an example of the flow rate control valve, and a description is given of a case in which the heater is a bar-shaped ceramic heater.

Figure 1:
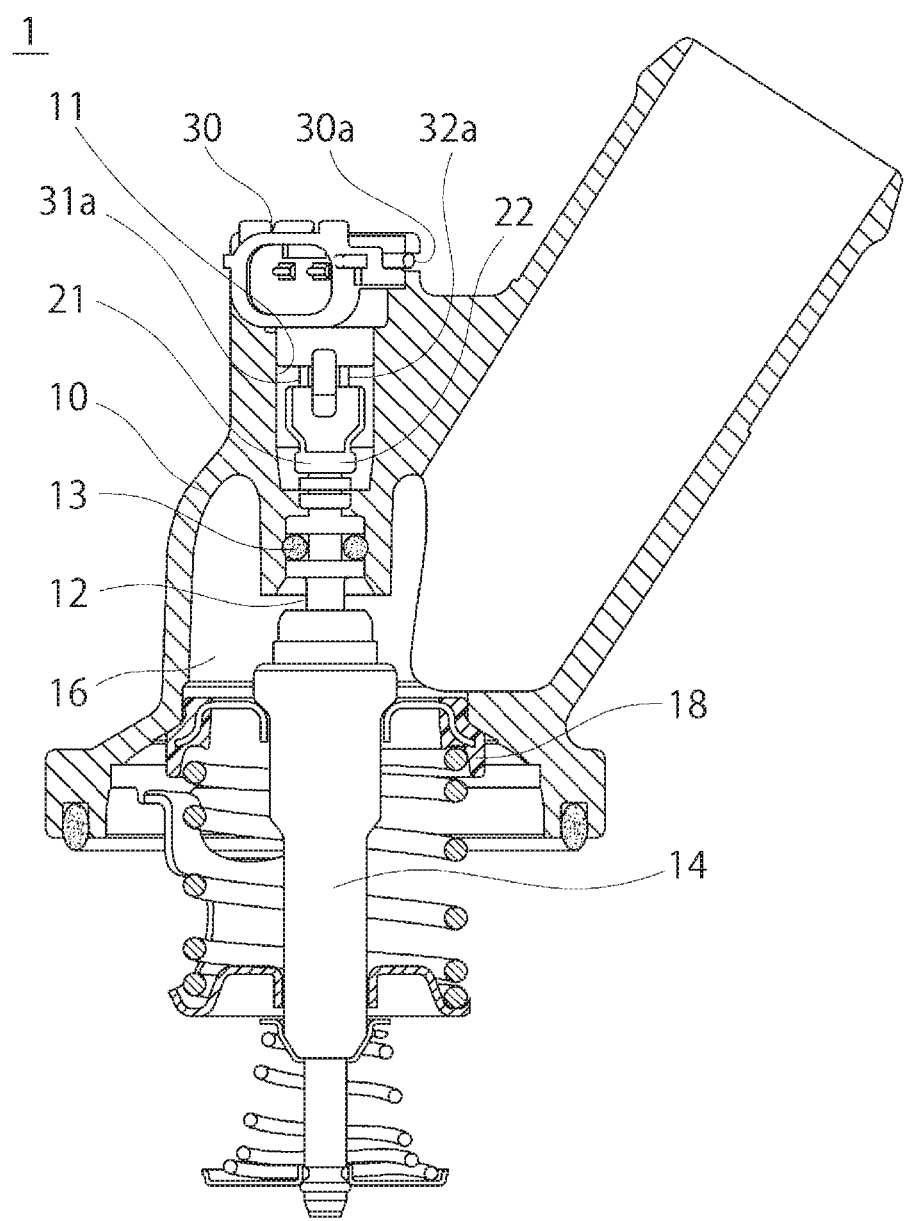
FIG. 1 is a cross-sectional view showing one embodiment of a lead wire insulating structure in a flow rate control valve device according to the present invention.

In FIG. 1, an electronically controlled thermal device, indicated as a whole by reference character 1, is comprised of a piston 12 having a substantially bottomed tubular shape and suspended in a device housing 10 and a thermo-element 14 fitted around the outside the piston 12 so as to be slidable in the axial direction thereof. A main valve stem 18 for opening and closing a flow passage 16 formed in the device housing 10 is provided to the axial middle portion of the thermo-element 14.

Note that, as is well known, a thermal expansion unit such as wax is enclosed in the thermo-element 14, and the tip of the piston 12 faces the inside of the thermal expansion unit to allow temperature control by a heater 20 described later that is disposed in the piston 12.

Also, in the electronically controlled thermal device 1, a spring and spring seat for biasing the main valve stem 18, a second valve stem as a bypass valve, a bypass spring, etc., are also disposed, but since these configurations are known a description thereof is omitted here.

Figure 2A:
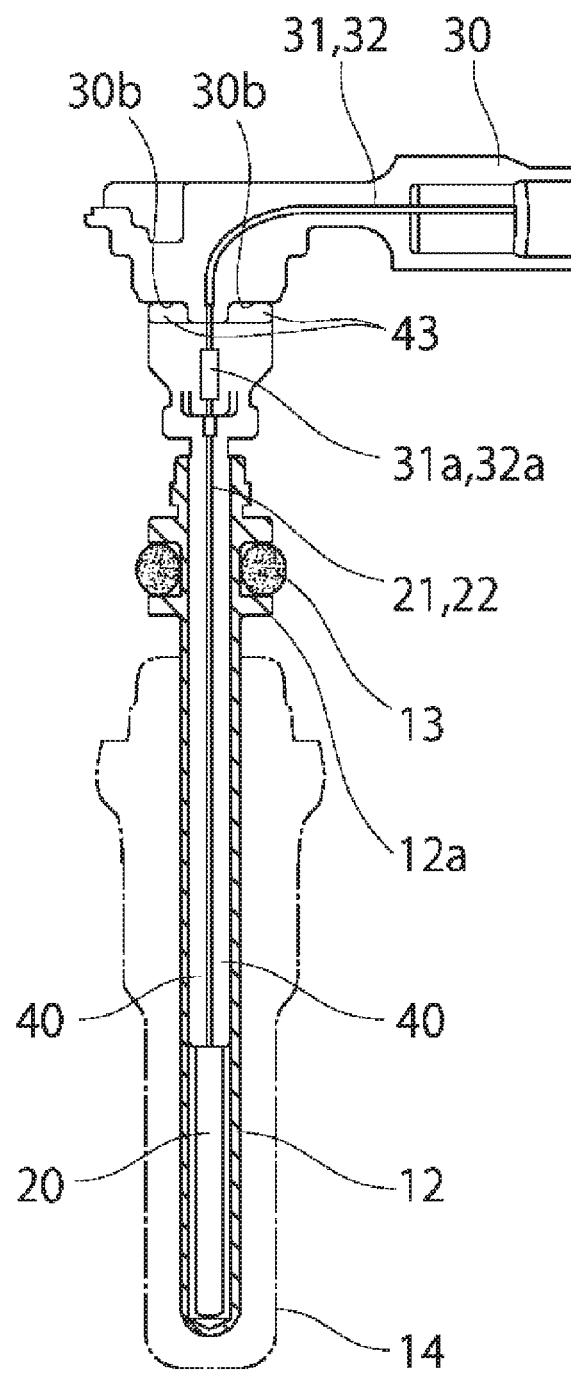
FIGS. 2A and 2B are a cross-sectional view of the assembled heater, lead wires, connector and piston, and a cross-sectional view of the assembled heater, lead, piston and thermo-element assembly, respectively, for illustrating the heater assembly that characterizes the present invention.
Figure 2B:
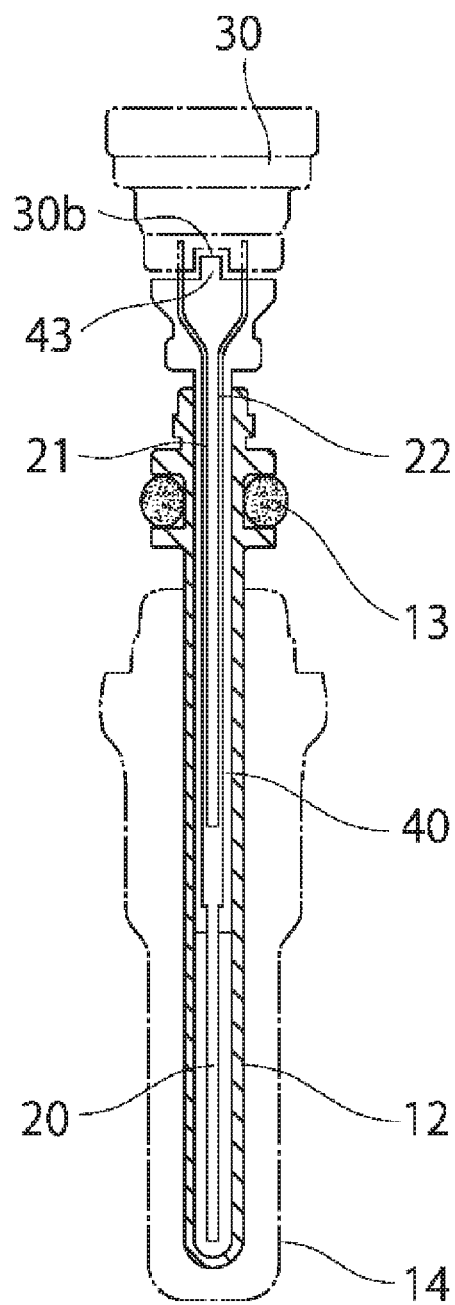
Figure 3:
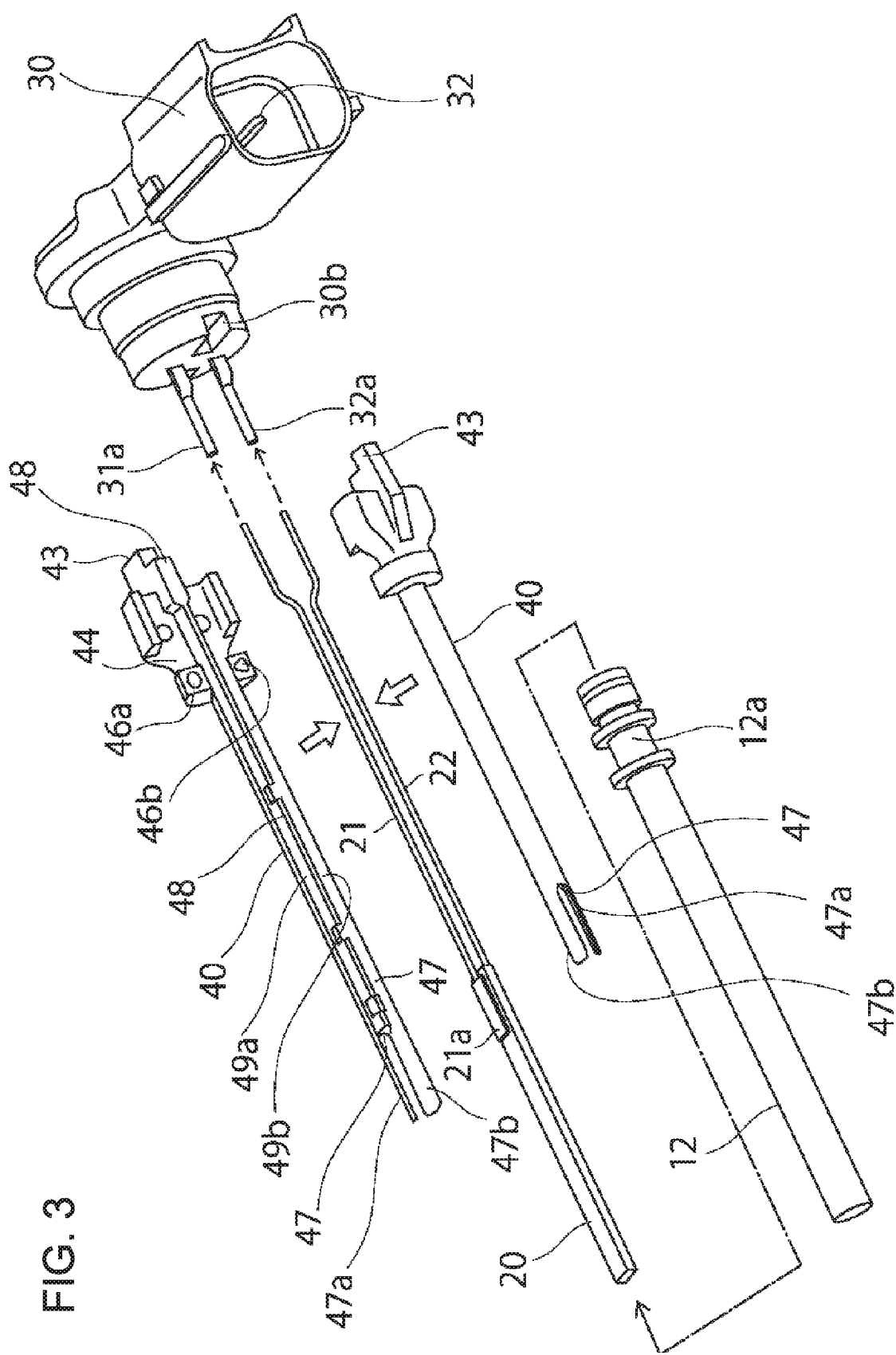
FIG. 3 is an exploded schematic perspective view showing the heater assembly of FIG. 2A.

According to the present invention, there is provided a ceramic heater 20 that is inserted in the piston 12. The heater 20, as shown in FIGS. 2A, 2B and FIG. 3, is formed substantially in the shape of a square rod in cross-section. A pair of lead wires 21, 22 extends from the rear end of the heater 20, and front ends of the lead wires 21, 22 are connected to connector terminals 31, 32 provided to a connector member 30. In FIG. 3, reference numerals 21*a* and 22*a* (only 21*a* is shown herein) are connecting end pieces provided at the ends of the lead wires 21, 22 on the heater 20 side, and are electrically connected to the heater 20 by soldering, brazing, or the like.

The connector member 30 is made of a synthetic resin material, inside of which the connector terminals 31, 32 are installed. A part of its inner end faces the inside of a lead wire extrusion hole 11 provided in the device housing 10 and in that state is fixedly mounted on the outside of the device housing 10. In the drawing, reference numeral 30*a* is a stop ring for fixing the connector member 30 in a state in which it is attached to the device housing 10. The outer end of the connector member 30 has a connector structure that is well known. The connector terminals 31, 32 exposed inside the connector member 30 are externally connected.

Figure 5:
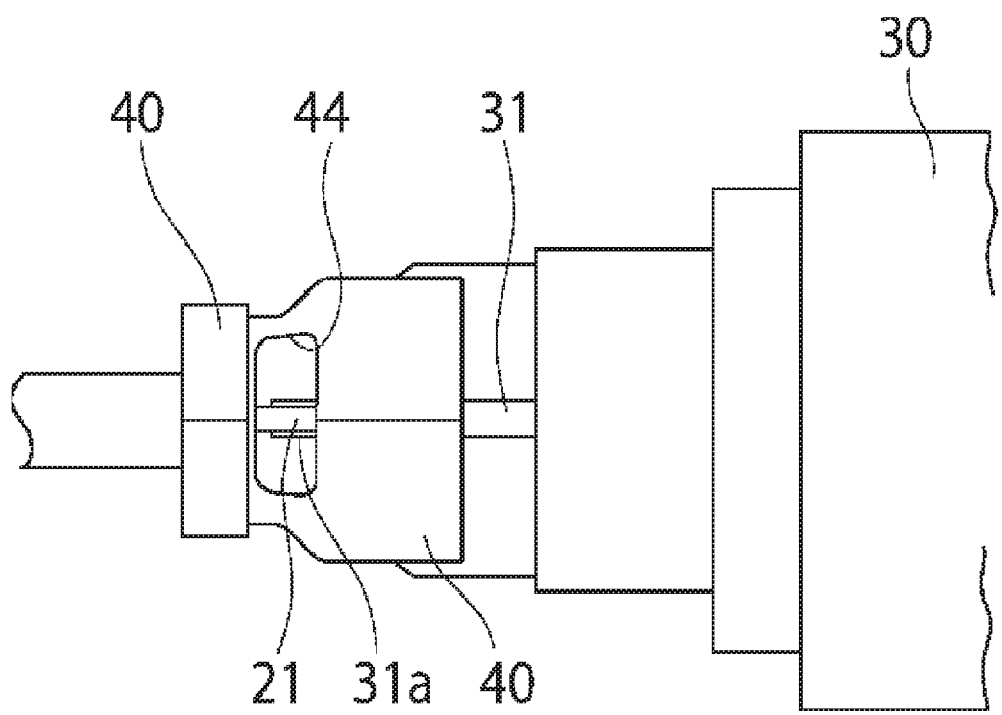
FIG. 5 is an enlarged explanatory view showing a connection portion between a heater lead wire in the heater assembly and a lead terminal connection piece provided on a connector terminal of a connector.

Lead end connecting pieces 31*a*, 32*a* are provided in the inner end of the connector terminals 31, 32 as shown in FIG. 3 and FIG. 5. The tips of the lead wires 21, 22 can be easily connected by spot welding or the like.

A pair of insulating rod pieces 40, 40 characterizing the present invention is provided on the outside of the lead end connecting pieces 31*a*, 32*a* of the heater 20, the lead wires 21, 22 and the connector terminals 31, 32 connected as described above.

More specifically, it is necessary to incorporate the electrical connection portion, which is the portion from the heater 20 to the inner end of the connector member 30, into the device housing 10 while maintaining them in an insulated state. For this reason, conventionally, individual insulating parts such as tubes and the like are used. Ain contrast, the present invention uses insulating rod pieces 40, 40 made of synthetic resin and configured so that a portion from the heater 10 to the inner end of the connector 30 can be insulated and held in place.

As is apparent from FIGS. 2A, 2B, 3 and 4A, 4B the insulating rod pieces 40, 40 are prepared as parts having the same shape so as to reduce the number of different parts and facilitate assembly. On the inside of the insulating rod pieces 40, 40, retention grooves for clamping and holding the rear end portion of the heater 20, and moreover, retention grooves or the like for clamping and holding the connecting portions while maintaining insulation of the lead wires 21, 22 and the lead end connecting pieces 31*a*, 32*a* of the connector terminals 31, 32, are formed. By putting together the insulating rod pieces 40, 40 and fitting together at least one or more engaging portions 46*a*, 46*b* formed as irregularities in the shape of triangles, spheres, ovals, rectangles, etc., all these elements can be assembled quickly and easily into a single unit. Note that, in FIG. 3 and elsewhere, the engagement convex portion is denoted by 46*a* and the engagement concave portion is denoted by 46*b*, and a case is shown in which these are provided at five places along the longitudinal direction of the insulating rod pieces 40, 40.

Note that although in FIG. 3 concave portions and convex portions are used as examples of the engaging portions 46*a* and 46*b*, the present invention is not limited thereto. Moreover, as to placement, these portions can of course be provided at appropriate positions as necessary. In the long insulating rod pieces 40, 40, it is preferable to provide them at a plurality of positions in the longitudinal direction.

Engagement convex portions 43, 43 for preventing twisting are provided in the rear end portions of the insulating rod pieces 40, 40, such that, by engaging engagement concave portions 30*b*, 30*b* formed in the inner end of the connector member 30, the insulating rod pieces 40, 40 and the connector member 30 are connected in a twist-free state. The engagement convex portions 43, 43 for preventing twisting and the concave portions of the connector member 30 may be fitted together loosely, because the insulating rod pieces 40, 40 holding the heater 20 and the lead wires 21, 22 need only have a structure capable of preventing twisting.

The insulating rod pieces 40, 40 are restrained from moving in the longitudinal direction by abutment with the end face of the connector member 30 having the engagement concave portions therein.

The front end of each of the insulating rod pieces 40, 40 is formed into a pair of resilient engaging pieces 47a, 47b between which a slit groove 47 is formed that presses down against and elastically holds the rear end portion of the substantially rectangular bar-shaped heater 20. The end portion of the rear end portion of the lead wire extension side of the heater 20 is configured to engage the groove bottom of slit grooves 47 in the insulating rod pieces 40, 40, that is, the edge of the base of the slit groove, such that the rear end portion of the heater 20 is elastically held from the outside by the pair of elastic engagement pieces 47a, 47b.

That is, the rear end portion of the heater 20 is elastically held between the two pairs of elastic engagement pieces 47a, 47b of the pair of insulating rod pieces 40, 40, and by engaging a part of the rear end portion of the heater 20, with the edges of the groove bottoms of the slit grooves 47 in the insulating rod pieces 40, 40, movement in the longitudinal direction of the insulating rod pieces 40, 40 can be restrained. Therefore, at the time of assembly, the insulating rod pieces 40, 40 maintain a state in which movement in the longitudinal direction between the end face having the concave portion of the connector 30 and the rear end portion of the heater 20 is restrained.

Further, by covering the rear end portion of the heater 20, the elastic engagement pieces 47a, 47b of the pair of insulating rod pieces 40, 40 also function to insulate and to protect the portion consisting of the connection end pieces 21a, 22a of the lead wires 21, 22 to the heater 20 from the piston 12.

As shown in FIG. 4A lead wire retention grooves 49a, 49b and a partition wall 48 for partitioning these are formed inside the insulating rod pieces 40, 40. In the assembled state, grease or the like covering the lead wires 21, 22 housed inside the grooves 49a, 49b is also sealed therein, but the insulating rod pieces 40, 40 are configured so that there is no leakage thereof.

Moreover, as shown for example in FIG. 3 and FIG. 5, a window 44 through which the state of the connection between the lead wires 21, 22 and lead end connecting pieces 31a, 32a can be seen visible is formed in a part of the rear end portions of the insulating rod pieces 40, 40. In this way, it is possible to visually confirm whether the lead wires 21, 22 of the heater 20 and the connector terminals 31, 32 are securely connected from the outside at the time of assembly, thereby providing not only superior workability but also improved efficiency.

Moreover, the piston 12 having the bottomed cylindrical shape is provided in such a manner that the heater 20 and the lead wires 21, 22 described above are clamped by the insulating rod pieces 40, 40 and the piston 12 fits over the heater 20. In the rear end portion of the piston 12, an O-ring mounting groove 12a is formed and an O-ring 13 is fitted thereto, and in that state the piston 12 is inserted from the inside of the device housing 10 to the inner end of the lead wire extrusion hole 11.

The heater assembly, consisting of the heater 20, the lead wires 21, 22, and the connector member 30 described above, is installed from the outside of the device housing 10, and is fixed in place by the stop ring 30a.

The above-described configuration provides the pair of insulating rod pieces 40, 40 that are configured so as to clamp the heater 20 at the front end side thereof and clamp the pair of lead wires 21, 22 extracted from the rear end side of the heater 20 along the longitudinal direction in an insulated state, and the connector member 30 installed on the rear end side which is the side of the insulating rod pieces 40, 40 opposite the portion that holds the heater. The connector member 30 has connector terminals 31, 32 provided at the inner ends of a pair of lead terminal connecting pieces 31a and 32a to which the respective lead wires 21, 22 are connected, and engagement concave portions 30a, 30a that engage the engagement convex portions 43, 43 for preventing twisting provided at the rear end side of the insulating rod pieces 40, 40.

That is, compared to the conventional structure, the number of constituent parts in the lead wire exposed portion of the heater 20, in particular the type and quantity of the insulating parts and the like, are reduced, as are the number of steps in the installation process, and moreover the production process equipment conventionally required, such as the tube cutter, tube heat/deformation machine, heater production machinery, etc., are reduced, and the structure can be installed using only a simple jig, so that the number of workers can be reduced, work efficiency can be greatly improved, and costs can be reduced.

Since the heater 20 and the pair of lead wires 21, 22 are clamped between the pair of insulating rod pieces 40, 40 and the piston having a bottomed cylindrical shape is provided so as to fit over the outside thereof, it is no longer necessary to resin mold the heater, lead wire and the like, and it is possible to reduce the risk of cracking of the ceramic heater, breaking or bending (twisting) of the lead wires, and the like.

Moreover, the functions of guiding the insulating rod pieces 40, 40 themselves with peripheral parts, the insulation function, the mounting function, the protection function of protecting the structure from vibrations from the automobile, and the conventional technology such as preventing the internal grease from easily leaking out due to vibration or the like can be combined in a single piece.

Also, because they are inserted into the interior of the piston 12 and into the device housing 10, the pair of insulating rod pieces 40, 40 will not come off. Moreover, because the connector member 30 having connector terminals 31, 32 that connect the lead wires 21, 22 by the lead end connection piece 31a, 32a is installed and fixedly mounted from the outside of the device housing 10, twisting of the lead wires 21, 22 in the direction of rotation and moreover to the heater 20, etc., can be prevented.

In addition, the insulating rod pieces 40, 40 are constructed so that two members of the same shape are fitted together to form a single piece by mating using only the elasticity of the resin, without requiring an adhesive or an adhesive device such as vibration welding. As a result, no additional material is required, and no special equipment is required. Moreover, not only the heater 20 and the lead wires 21, 22 but also the insulating rods 40, 40 can be assembled and fixed while preventing twisting.

It is to be understood that the present invention is not limited to the structure described in the above embodiment, and it goes without saying that the shape, structure, etc., of each part constituting the electronically controlled thermal device 1 can be appropriately modified and changed.

For example, the shape of the flow passage 16 formed in the device housing 10, the opening and closing control state of the valve stem 18, etc., can be freely changed as needed. In addition, although the ceramic heater 20 is used as an example, alternatively any similar sort of heater may be used.

Moreover, although a case in which the lead wires 21, 22 are connected to the lead terminal connecting pieces 31a, 32a of the connector terminals 31, 32 by welding or the like has been described above, the present invention is not limited thereto, and any appropriate wiring connection method can be used.

DESCRIPTION OF REFERENCE CHARACTERS

1 Electronically controlled thermostat device (fluid control valve device)
10 Device housing
11 Lead wire extrusion hole
12 Piston
14 Thermo-element
16 Flow passage
20 Ceramic heater (heater)
21, 22 Lead wires
30 Connector member
31, 32 Connector terminals
31a, 32a Lead end connecting pieces
40 Insulating rod pieces
43 Engagement convex portion
44 Window
46a, 46b Engaging portions (engagement concave portions, engagement convex portions)
47 Slit grooves
47a, 47b Elastic engagement pieces
48 Partition wall
49a, 49b Lead wire retention grooves

What is claimed is:

1. A lead wire insulating structure in a flow rate control valve device, the flow rate control valve device including a heater inserted and disposed in a device housing, the lead wire insulating structure comprising:
 a pair of insulating rod pieces configured to clamp the heater by a front end portion and clamp and hold a pair of lead wires from the heater while maintaining the lead wires in an insulated state; and
 a connector member attached to a side of the insulating rod pieces opposite a side on which the insulating rod pieces clamp the heater,
 the connector member having on an inner end a pair of lead end connecting pieces to which the lead wires are connected, and an engagement concave portion that engages an engagement convex portion provided on a side of the insulating rod pieces opposite the side on which the insulating rod pieces hold the heater.

2. The lead wire insulating structure in a flow rate control valve device according to claim 1, wherein the pair of insulating rod pieces are formed in the same shape and are provided with one or more engaging portions when the insulating rod pieces are put together to form a single unit that clamps the heater and the pair of lead wires on both sides thereof.

3. The lead wire insulating structure in a flow rate control valve device according to claim 1, wherein a window, through which a state of connection between the lead wires and the lead end connecting pieces is visible, is formed in a part of a rear end portion of the pair of insulating rod pieces.

4. The lead wire insulating structure in a flow rate control valve device according to claim 1, wherein movement in a longitudinal direction of the insulating rod pieces is restricted by the insulating rod pieces being clamped between the end portion of the heater on the lead wire exposed side and the end portion of the connector member provided with the engagement concave portion.

5. The lead wire insulating structure in a flow rate control valve device according to claim 4, wherein an end portion of the heater on the lead wire exposed side is configured to engage a bottom edge portion of slit grooves in the insulating rod pieces.

6. The lead wire insulating structure in a flow rate control valve device according to claim 1, wherein the heater and the lead wires are clamped by the pair of insulating rod pieces and a piston having a substantially bottomed cylindrical shape is fitted around the outside of the heater and lead wires.

7. The lead wire insulating structure in a flow rate control valve device according to claim 1, wherein the heater is a ceramic heater.

8. The lead wire insulating structure in a flow rate control valve device according to claim 1, wherein the flow rate control valve device is an electronically controlled thermostat device in which the heater for temperature control of a thermo-element that senses temperature of a fluid is inserted.

* * * * *